(12) United States Patent
Fischl et al.

(10) Patent No.: US 6,252,379 B1
(45) Date of Patent: Jun. 26, 2001

(54) VARIABLE ON DEMAND ENERGY SOURCE

(75) Inventors: Steven Ross Fischl, Lawrenceville; Iilonga Pendapala Thandiwe, Atlanta, both of GA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/580,346

(22) Filed: May 25, 2000

(51) Int. Cl.$^7$ .................................................. H01M 10/46

(52) U.S. Cl. ............................................................ 320/134

(58) Field of Search .................................. 320/104, 127, 320/128, 134, 136

(56) References Cited

U.S. PATENT DOCUMENTS 3,624,481 * 11/1971 Macharg .
3,912,978 * 10/1975 Poole .

* cited by examiner

Primary Examiner—Edward H. Tso
(74) Attorney, Agent, or Firm—Philip H. Burrus, IV

(57) ABSTRACT

A cell current limiting circuit includes a current-limiting device that electrically couples a cell to a battery terminal. A bypass current path is in parallel with the current limiting device and is selectively interruptible by a switch. A switch control circuit is capable of sensing if the battery terminal is electrically coupled to a selected host. The switch control circuit closes the switch if the battery terminal is electrically coupled to the selected host and opens the switch if the battery terminal is not electrically coupled to the host.

6 Claims, 1 Drawing Sheet

VARIABLE ON DEMAND ENERGY SOURCE

BACKGROUND OF THE INVENTION

1. Field of the Invention

The present invention relates to battery systems and, more specifically, to circuits that limit current in battery systems.

2. Description of the Prior Art

Battery packs, such as those used to power cellular telephones and other portable electronic equipment, usually include devices to prevent substantial current flow from the cells when a short across a battery pack's terminals occurs. Such a device usually takes the form of a fuse, which opens when current flow exceeds a predefined threshold. Because a fuse opens permanently, the battery pack becomes unusable once an over-current situation occurs.

Many shorts are "soft" shorts that occur when the battery pack is disconnected from its host (which could be a piece of equipment or a battery charger). For example, a battery pack that is placed in a purse or a pocket may become shorted by a key or a gum wrapper. Since such a short is only transitory, it is desirable to have a battery pack that limits current during a soft short, but that is still usable once the battery pack is reconnected to its host.

Some battery packs include resettable circuits for interrupting the discharge current. An integrated circuit detects the voltage drop across a series resistor or across the on-resistance of a series field effect transistor (FET) and opens the FET to prevent any additional current flow. Additionally, a temperature and current activated polymer device such as a poly-switch may be used to interrupt high current flow. Unlike a fuse, in both of these cases the devices are resettable. However, in both cases a relatively high discharge current is required to activate the short circuit protection, but no protection is offered for a soft short where the discharge current may be significantly above the operating current of the host device but below the threshold of the hard short protection circuit. Additionally the accuracy of the over current threshold on such prior art devices is typically poorly and loosely defined Simply opening a series discharge switch to prevent any current flow when the battery pack is disconnected from the host is not a viable option in systems where the host requires power on demand and where the host uses this power to indicate to the battery that it is attached to a host. If the battery simply removes power from its term anytime it is disconnected from the host, then the host will not know when to reapply power because the host never receives power to turn itself on and indicate to the battery that a host is reattached.

Therefore, there is a need for a current limiting circuit that restricts current flow from a battery when the battery is disconnected from a host, but that allows regular current flow from the battery when the battery is reconnected to the host.

DETAILED DESCRIPTION OF THE INVENTION

Figure 1:
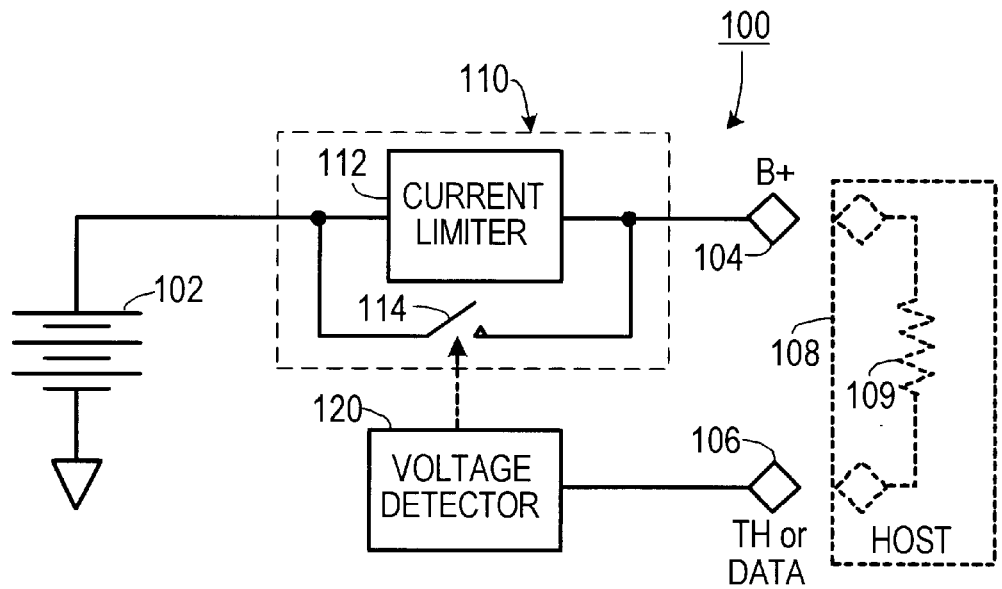
FIG. 1 is a schematic diagram of one embodiment of the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1, one embodiment of the invention is a cell current limiting circuit 100 that limits current from a cell 102 to a battery terminal 104 if the battery terminal 104 is disconnected from a selected host 108. (For example, the host 108 could be a cellular telephone and the cell 102 could be of the type that is part of a battery pack that provides power to the telephone. Similarly, the host 108 could be a battery charger.) The current limiting circuit 100 includes a controlled current transfer unit 110 and a control circuit 120 (such as a voltage detector) that senses if the battery terminal 104 is electrically coupled to the host 108 and, if so, causes the controlled current transfer unit 110 to allow current to flow freely from the cell 102 to the battery terminal 104. If the control circuit 120 senses that the battery terminal 104 is not electrically coupled to the host 108, then it causes the controlled current transfer unit 110 to limit current flowing to the battery terminal 104 to a minimal amount.

Sensing connection of the battery terminal 104 to the host 108 may be done, for example, by sensing voltage from a the battery terminal 104 to a feedback terminal 106 that has passed through a pull-up resistor 109. Similarly, the feedback terminal 106 could receive a data input from a logic circuit in the host 108 that indicates connection status.

Once the battery terminal 104 is disconnected from the host, the control circuit 120 drives the controlled current transfer unit 110 to a minimally conductive state. When the battery terminal 104 is reconnected to the host 108, the control circuit 120 has to be notified of the reconnection. Unless the host 108 includes a low power backup battery, the host 108 must receive a minimal amount of power from the cell 102 in order to generate a signal to the control circuit 120 that indicates reconnection of the battery terminal 104 to the host 108. Therefore, the minimal amount of current is approximately the amount sufficient to drive a signal in the host 108 that would indicate to the control circuit 120 that the host is connected to the battery terminal 104.

In an illustrative cellular phone battery pack application, the disconnected minimal current could be in the range of 30 mA to 60 mA, while the connected current could be in the range of 200 mA to 600 mA. It will be readily understood that many other current ranges could be used, depending upon the requirements of the specific application.

The controlled current transfer unit 110 includes a current-limiting device 112, such as a current limiting resistor, that is bypassed by a switch 114 that is in parallel with the current-limiting device 112, forming a bypass current path. The resistance of a resistor used for the current-limiting device 112 would typically be in the range of 50 Ù to 150 Ù (if used with a single cell lithium-ion battery). However, it is understood that resistors outside of this range may be employed in other applications without departing from the scope of the invention The control circuit 120 closes the switch 114 when the battery terminal 104 is connected to the host 108, thereby allowing the cell 102 to freely power the host 108. When the battery terminal 104 is disconnected from the host 108, the control circuit 120 opens the switch 114, thereby forcing all current to flow through the current-limiting device 112. Thus, when the battery terminal 104 is detached from the host 108, current flow is limited to a minimal amount if, for example, the battery terminal 104 is inadvertently shorted to ground. When the battery terminal 104 is reconnected to the host 108, the control circuit 120 senses the trickle current from the current-limiting device 112, as fed back through the host 108 and closes the switch 114, thereby allowing the cell 102 to resume powering the host 108.

The invention, by allowing a minimal current to flow through the current limiting device 112, sources enough power to the host 108 to activate it sufficiently to allow a signal to the battery 102 (via a thermistor, a data terminal or some other means, as would be readily known to those of skill in the art of battery pack design). This signal is used by the battery 102 as acknowledgment that a valid host 108 is attached When the battery pack is attached to a valid host 108, the current liming device 112 is bypassed, allowing the full power of the battery 102 to be delivered to the host 108. Thus, the invention limits the amount of power that a battery 102 can deliver into a soft short, while simultaneously allowing enough current to power up the host 108 initially at a low level sufficient for the host 108 to signal the circuit 100 of its presence. Subsequently, the battery 102 is allowed to deliver full power once the battery 102 detects the host 108. The current limiting device 112, which is typically implemented as a resistor, can be used to define an accurate short threshold limit. In the process of providing soft short protection, the invention also provides hard short protection by limiting the power deliverable into any short.

Figure 2:
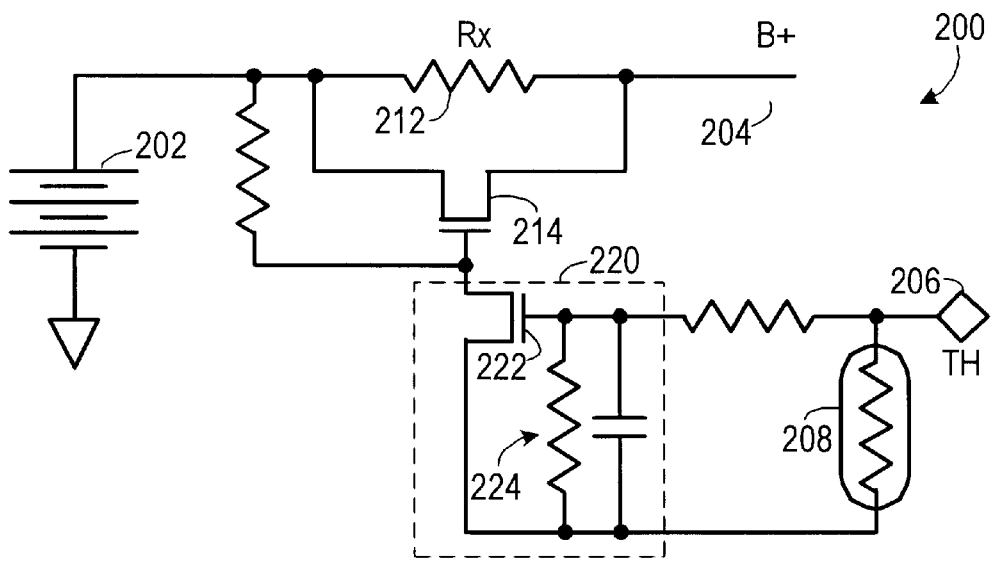
FIG. 2 is a schematic diagram of a specific illustrative embodiment of the invention.

In one specific battery pack 200 embodiment shown in FIG. 2, the current limiting function is performed by a resistor 212 and the switching function is performed by a transistor 214 in series with a cell 202 and a battery terminal 204. (Generic transistor symbols are shown in FIG. 2, as they could be n-channel or p-channel MOSFETS or bipolar junction transistors, or of the many other transistor types and configurations generally known to those of skill in the art.) The control circuit 220 includes a transistor 222 and input biasing circuit elements 224 that allow it to control the switch 214 as a function of the voltage on a thermistor 208 line. The thermistor 208 would typically provide an indication to a charger of an over temperature condition and, thus, receives a voltage from a thermal sense feedback terminal 206. This signal could also indicate to the control circuit 220 whether the battery pack 200 is connected to a host.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A cell current limiting circuit, comprising:
   a. a current-limiting device that electrically couples a cell to a battery terminal;
   b. a bypass current path, in parallel with the current limiting device, that is selectively interruptible by a switch; and
   c. a switch control circuit capable of sensing if the battery terminal is electrically coupled to a selected host, the switch control circuit capable of closing the switch if the battery terminal is electrically coupled to the selected host and capable of opening the switch if the battery terminal is not electrically coupled to the host.

2. The apparatus of claim 1, wherein the switch comprises a transistor.

3. The apparatus of claim 2, wherein the transistor is a field effect transistor.

4. The apparatus of claim 2, wherein the transistor is a bipolar junction transistor.

5. The apparatus of claim 1, wherein the current limiting device comprises a resistor.

6. The apparatus of claim 1, wherein the current limiting device comprises a semiconductor circuit biased so as to limit current flow there through to a preselected maximum.

\* \* \* \* \*